United States Patent [19]
Akeel et al.

[11] 3,975,030
[45] Aug. 17, 1976

[54] CHUCK WITH DUAL INDEPENDENTLY ACTUABLE SETS OF JAWS

[75] Inventors: A. Hadi K. Akeel, Sterling Heights; Romuald Gmurowski, Mount Clemens; Eberhard E. Wasserbaech, Sterling Heights, all of Mich.

[73] Assignee: General Motors Corporation, Detroit, Mich.

[22] Filed: June 18, 1975

[21] Appl. No.: 587,818

[52] U.S. Cl................................. 279/4; 82/45; 279/1 C; 279/1 DL; 279/1 J; 279/17; 279/113; 279/121
[51] Int. Cl.².................. B23B 31/14; B23B 31/18
[58] Field of Search .................. 279/1 C, 1 DC, 1 J, 279/4, 17, 113, 121; 82/45

[56]  References Cited
UNITED STATES PATENTS

| | | | |
|---|---|---|---|
| 1,713,803 | 5/1929 | Whiton | 279/113 |
| 2,528,442 | 10/1950 | Leiter | 279/4 |

*Primary Examiner*—Othell M. Simpson
*Assistant Examiner*—Z. R. Bilinsky
*Attorney, Agent, or Firm*—Robert M. Sigler

[57]  ABSTRACT

A chuck for a chucking machine has a rotatably supported toroidal body having first and second sets of jaws projecting inward from its inner periphery, the first and second sets of jaws being axially spaced from one another. Each of the sets of jaws has its own actuating mechanism comprising a lead screw engaging each jaw for the movement thereof. All of the lead screws of a set are controlled by a ring gear actuable by a fluid pressure motor to simultaneously advance or withdraw all the jaws of a set. At least the second set of jaws has a slip clutch associated with each lead screw to allow engagement of all jaws with the workpiece regardless of irregularities in the workpiece surface. Separate locking means are provided for each sets of jaws comprising a collar associated with each lead screw, a locking member biased against each collar to apply locking force to the associated jaw and a fluid pressure motor to release the locking force of the locking members of a set to allow advance or withdraw of the jaws by the lead screw. Each jaw has an associated counterweight engaged through a pinion gear to help maintain clamping force at high rotational speeds. The chuck has fluid supply means to the fluid pressure motors including at least one annular channel in the toroidal body open on one axial side, a stationary annular face seal in the stationary portion of the chuck adjacent the open side of the annular channel, a fluid supply passage through the face seal and means for biasing the base seal toward the annular channel for sealing only during the passage of pressurized fluid therethrough for actuation of a fluid pressure motor.

3 Claims, 6 Drawing Figures

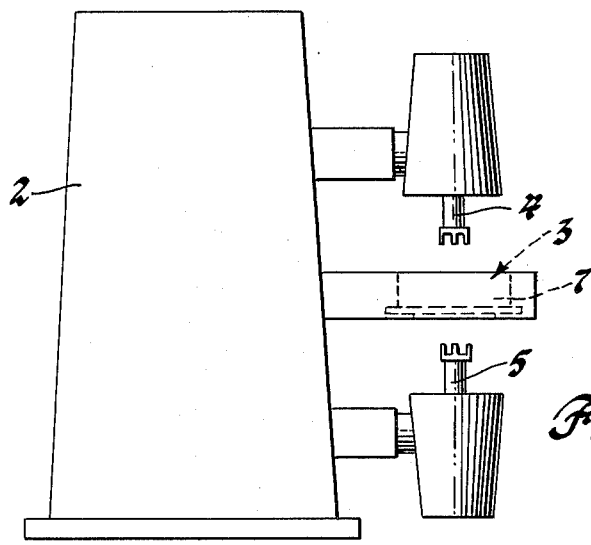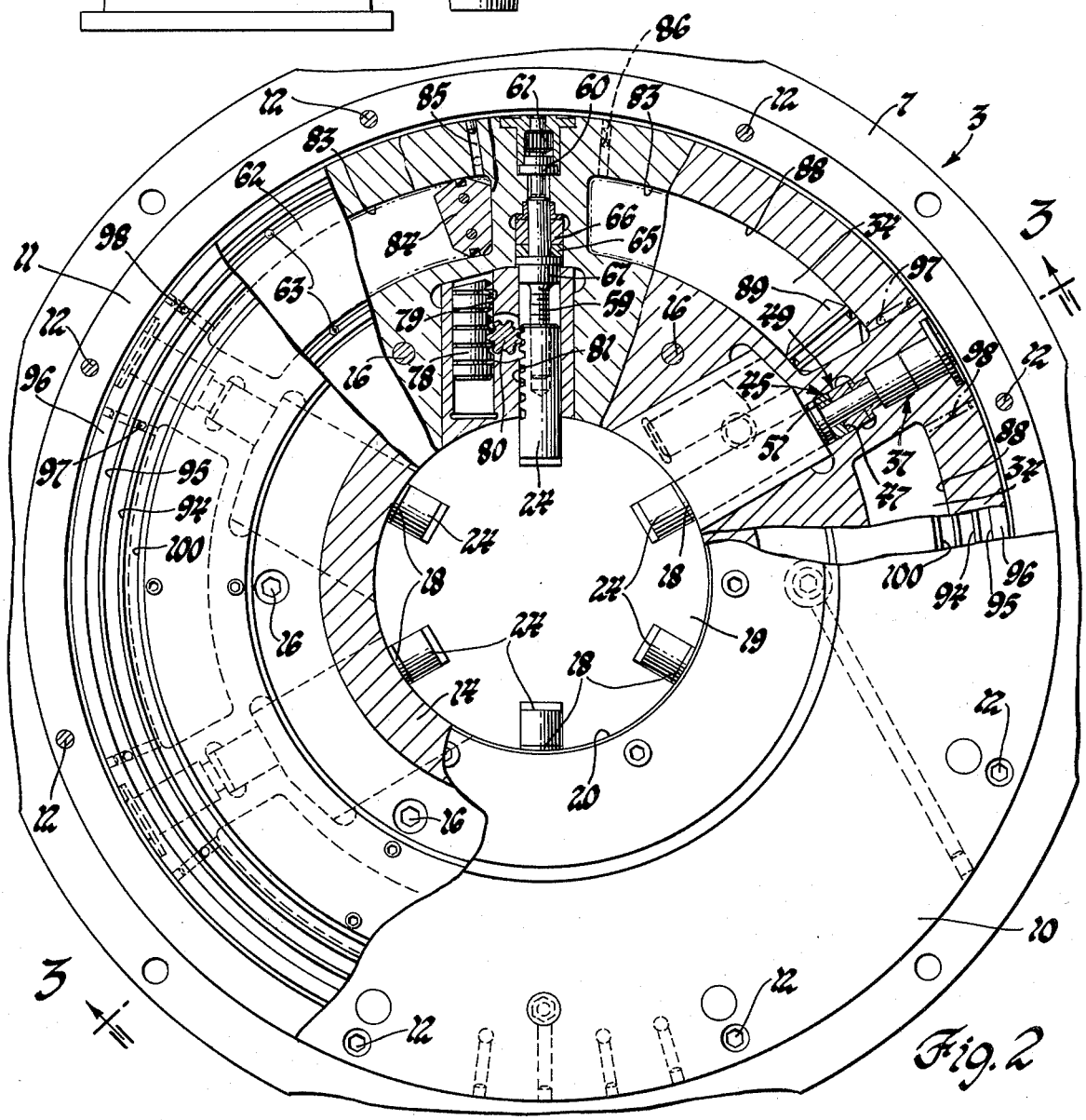

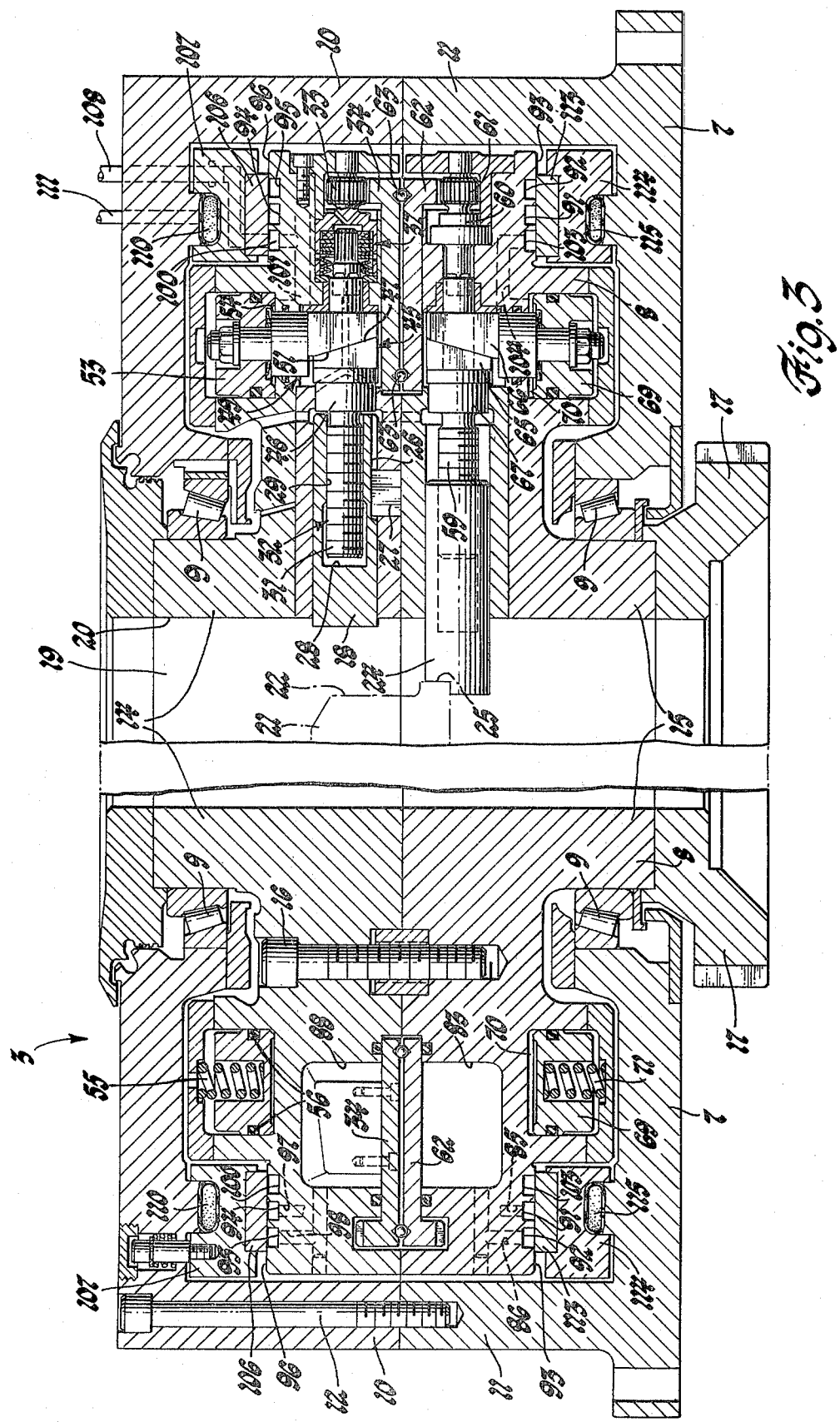

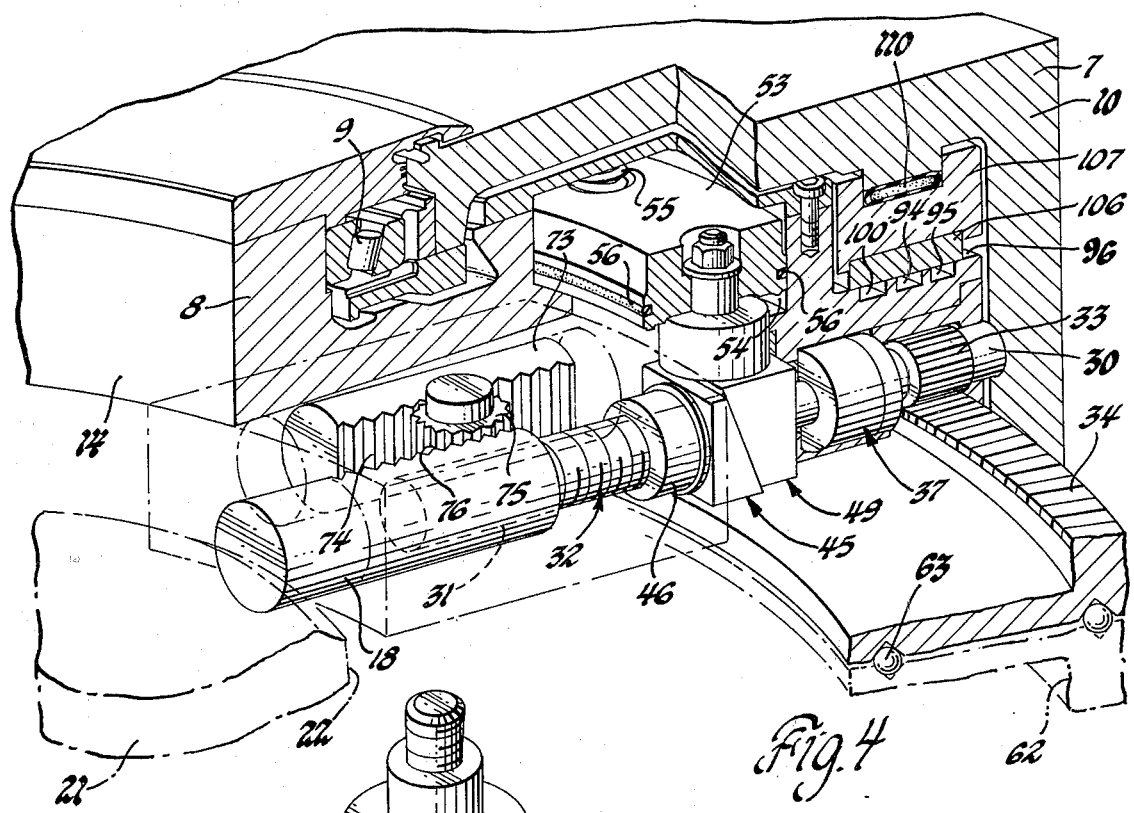
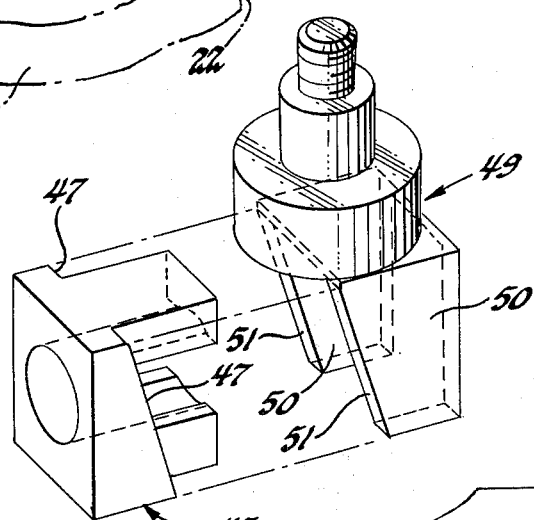
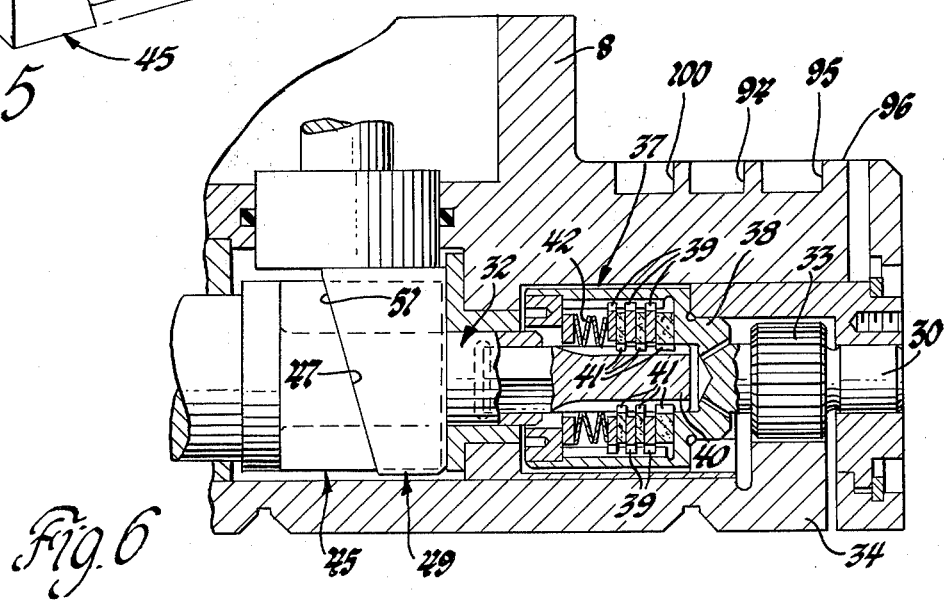

3,975,030

CHUCK WITH DUAL INDEPENDENTLY ACTUABLE SETS OF JAWS

SUMMARY OF THE INVENTION

This invention relates to apparatus for clamping a workpiece on a machine so that the workpiece can be fully machined without being removed for reclamping on the same or another machine. It particularly relates to a chuck with two sets of jaws which permits the cutting tools on a high production machine to reach the workpiece from two sides of the chuck simultaneously while the workpiece is clamped by either of the jaw sets.

Prior art chucks generally require that, after a workpiece has been machined on those surfaces which are accessible, the machine be stopped and the workpiece shifted in the chuck to allow machining of the surfaces that were previously inaccessible because of the jaws. The chuck of this invention, however, is adapted to grip the workpiece on a first surface and allow cutting tools to approach the workpiece from both sides of the chuck, grip the workpiece with the second set of jaws at a second surface while the workpiece continues to rotate and withdraw the first set of jaws so that cutting tools can again approach the workpiece from both sides of the chuck to complete the machining of the workpiece.

The chuck of this invention therefore permits full machining of a workpiece on a machine in one setting to reduce idle time and production costs by eliminating the need to stop the machine and reclamp the workpiece.

The chuck of this invention further increases machining accuracy by eliminating the possibility of multiple axes of rotation of the workpiece due to reclamping and eliminating part distortion due to out-of-round workpieces, dirt or chips during clamping by providing "floating" jaw capability.

The chuck of this invention further provides pressurized fluid supply means including collection channels in the rotating portion, an adjacent stationary face seal and means to actuate the face seal only when necessary to reduce heat and wear therein.

In particular, each set of jaws of this chuck is actuated by a plurality of lead screws controlled by a ring gear which can be moved in one direction or the other by a fluid pressure motor to advance or retract the jaws. Clamping means is provided for each set of jaws comprising a collar associated with each lead screw, a locking member normally biased against the collar to apply locking force to the workpiece and a fluid pressure motor to release the locking bias and allow movement of the jaws by the ring gear. Counterweights engaged by the jaws through pinion gears counteract the effect of centrifugal forces which would otherwise reduce clamping pressure at high rotational speeds.

At least one of the sets of jaws, and both if desired, is provided with a slip clutch on each lead screw to limit the force applicable to the jaw and thus permit all jaws to clamp the workpiece in spite of irregularities in the workpiece surface or dirt and chips adhering thereto.

In order to supply fluid under pressure from the stationary to the rotating portion of the chuck for actuation of the various fluid pressure motors, one or more open annular channels are provided in the rotating portion of the chuck axially adjacent a non-rotating face seal in the stationary portion of the chuck having fluid pressure passages cut therethrough. Fluid pressure is thus communicated from the stationary passages in the face seal to the rotating annular channels, from which it is communicated through passages within the rotating portion of the chuck to the appropriate fluid pressure motors. In order to reduce heat and save wear on the face seal, the face seal is axially movable and normally not biased against the rotating member of the chuck. Means are provided to temporarily bias the face seal against the moving portion of the chuck only when fluid pressure is being supplied through the face seal and annular channels.

Further details and advantages of this invention will be apparent from the accompanying drawings and following description of the preferred embodiment.

SUMMARY OF THE DRAWINGS

FIG. 1 shows a machine fitted with a chuck according to this invention.

FIG. 2 shows a top view, partially cut away, of a chuck according to this invention.

FIG. 3 shows a cutaway view along line 3—3 in FIG. 2.

FIG. 4 shows a partial cutaway view in perspective of a portion of a chuck according to this invention.

FIG. 5 is a perspective view of a portion of the clamping mechanism used in the chuck of this invention.

FIG. 6 is an enlarged view of a portion of FIG. 3.

DESCRIPTION OF THE PREFERRED EMBODIMENT

FIG. 1 shows a machine 2 with a chuck 3 adapted to hold a workpiece and rotate the workpiece about a vertical axis. Tools 4 and 5 are positioned to approach the workpiece on both sides of the chuck. Chuck 3 does not necessarily have to be positioned to rotate about a vertical axis; any convenient axis is permissible. In addition, more than one chuck 3 may be placed on machine 2 for simultaneous operation in a mass production situation.

Chuck 3 comprises a stationary frame 7 in which a toroidal body 8 is rotatably disposed on bearings 9, as seen in FIG. 3. Also as seen in FIG. 3, stationary frame 7 comprises half frames 10 and 11 bolted axially together with bolts 12. Toroidal body 8 likewise comprises two halves 14 and 15 joined axially with bolts 16. This construction allows the chuck to be assembled and disassembled. Power input means such as driving gear 17 fixed to toroidal body 8 engages appropriate driving means, not shown, in machine 2, to turn toroidal body 8 about its axis.

Disposed in toroidal body half 14 is a set of jaws 18 movable radially with respect to the axis of chuck 3. Jaws 18 are shown in a withdrawn position within toroidal body half 14 but are movable into a workpiece area 19 defined by inner periphery 20 of toroidal body 8 to engage a workpiece 21 on an outer surface 22 thereof. Although any number of appropriately spaced jaws 18 greater than 2 will hold a workpiece for rotation about an axis, the preferred embodiment shown includes six jaws 18 to hold the workpiece 21 with more strength and certainty.

Likewise, toroidal body half 15 contains a set of jaws 24 axially spaced from jaws 18 and also radially movable through inner periphery 20 from a withdrawn position within toroidal body half 15 into the position shown, engaging workpiece 21 on an outer surface 25.

Six jaws 24 are provided in this preferred embodiment, although any number greater than two could be used.

All of jaws 18 and 24 are provided with longitudinal slots similar to slot 26 of jaw 18 in FIG. 3 which engages a key 27 fixed in toroidal body 8 to prevent jaw 18 from rotating but allow movement radially of the axis of chuck 3. In addition, each of jaws 18 and 24 has a hollow bore defining an internal threaded surface similar to bore 28 and internal threaded surface 29 of jaw 18 in FIG. 3. A threaded end 31 of a lead screw 32 projects into bore 28 and engages internal threaded surface 29 of each jaw 18. Lead screw 32 is thus effective, by rotating in one direction or the other, to move jaw 18 into and out of engagement with workpiece 21.

Referring to FIGS. 3 and 4, each lead screw 32 engages a pinion member 30 with a pinion gear 33. The pinion gears 33 of all lead screws 32 are engaged by a ring gear 34 which by rotating through a fraction of a revolution in one direction or the other is effective to turn the lead screws and advance or retract all the jaws 18.

The engagement of each lead screw 32 to its associated pinion member 30 is made through a slip clutch 37, as shown in FIG. 6. Although the exact construction of slip clutch 37 is not important to this invention, the embodiment shown has an outer shell 38 engaging pinion member 30 and having a plurality of clutch plates 29 attached thereto and an inner shaft 40 engaging lead screw 32 and having a plurality of clutch plates 41 attached thereto interspersed between clutch plates 39. Springs 42 apply pressure between clutch plates 39 and 41 to determine a maximum torque transmittable by clutch 37.

Referring to FIGS. 3 and 4, locking means are provided to supply a locking or clamping force through lead screw 32 and jaw 18 to the workpiece 21. A collar 45, shown in detail in FIG. 5, rides on an unthreaded portion adjacent a flange 46 of lead screw 32. Collar 45 is provided with a pair of pressure receiving surfaces 47 forming an acute angle with an imaginary plane drawn perpendicular to the lead screw axis. A lock member 49 has a pair of forked legs 50 which straddle collar 45 and lead screw 32. Each of legs 50 has a pressure surface 51 parallel to pressure surface 47 of collar 45 and adjacent thereto.

As seen in FIGS. 3 and 4, all the lock members 49 are bolted to a single annular piston 53 which forms a fluid pressure motor within an annular chamber 54. A plurality of springs 55 exert pressure on annular piston 53 to bias lock members 49 into engagement with collars 45; and the acute angle of engaging pressure surfaces 47 and 51 changes the direction of this force 90° to exert an axial loading force through flange 46, lead screw 32 and jaw 18 onto workpiece 21. Annular piston 53 is provided with a pair of annular ring seals 56 which engage the sides of chamber 54 and thus permit annular piston 53 to be raised against the bias of springs 55 by the admission of pressurized fluid into chamber 54 below piston 53. The consequent release of the force of springs 55 allows the jaws 18 to be moved by ring gear 34.

Referring to FIG. 3, most of the elements described in the mechanism for moving and locking jaws 18 are duplicated for jaws 24. A lead screw 59, corresponding to lead screw 32, engages a pinion member 60 having a pinion gear 61, corresponding to pinion gear 33, which engages a ring gear 62, corresponding to ring gear 34. Ring gears 34 and 62 are separated by a plurality of ball bearings 63 contained within grooves in ring gears 34 and 62. Collars 65, similar to collars 45, ride on lead screw 59 and are engaged by locking members 66 and flanges 67 in lead screws 59.

Locking members 66 are all bolted to an annular piston 69 in an annular chamber 70 forming another fluid pressure motor; and a locking bias is provided by a plurality of springs 71, corresponding to springs 55.

The only item missing from the actuating mechanism of jaws 24 that is present for jaws 18 in this embodiment are slip clutches corresponding to slip clutches 37. Of course, the chuck of this invention could be made with such slip clutches. Assuming that jaws 24 are the first to be advanced to the workpiece, slip clutches might or might not be required, depending on the number of jaws, the tolerances of the jaw mechanism and the cleanliness of the part. In an embodiment with only three jaws 24, slip clutches might not be required, since the three jaws might be allowed to locate the axis of rotation or the entire jaw mechanism could be allowed to float. Actually, due to the possibility of dirt or abnormalities on surface 25 and unevenly advancing jaws 24, it is advisable to include slip cluthces similar to 37. Jaws 24 are shown without such slip clutches to show the connection of pinion member 60 to lead screw 59 if slip clutches are not included.

It is necessary for jaws 18, the second set of jaws to be engaged, to have slip clutches so that the axis of rotation of the part will not be shifted when the jaws are changed. This is true regardless of whether or not slip clutches are provided for jaws 24 and regardless of the number of jaws 18.

Referring to FIG. 4, a counterweight 73 is disposed adjacent each jaw 18 for movement in a direction parallel to that of jaw 18. Counterweight 73 has gear teeth 74 cut on the side facing jaw 18 and is engaged by a pinion gear 75, which also engages similar teeth 76 on jaw 18. The mass of counterweight 73 is designed so as to produce a desired reduction or cancellation of centrifugal force effects on jaws 18. Refering to FIG. 2, similar counterweights 78 with gear teeth 79 are coupled by pinion gears 80 to gear teeth 81 of jaws 24.

Referring again to FIG. 2, one or more arcuate chambers 83 are provided, each of which contains a piston 84 movable between opposite ends of the chamber 83 and fixed to ring gear 62. Fluid passages 85 and 86 communicate with opposite ends of each chamber 83 to supply pressurized fluid to one or the other side of pistons 84. Each piston 84 in chamber 83 comprises a fluid pressure motor driving ring gear 62 to advance or retract the jaws 18. Corresponding chambers 88 and pistons 89 are provided to form a fluid pressure motor for ring gear 34, as seen in FIG. 3.

As seen in FIG. 2 and 3, fluid passages 85 and 86 communicate, respectively, with annular channels 91 and 92 in an axial surface 93 of toroidal body half 15. Similar annular channels 94 and 95 in an axial surface 96 of toroidal body half 14 communicate, respectively, through fluid passages 97 and 98 to the opposite ends of each chamber 88. Thus annular channels 94 and 95 serve as collectors for pressurized fluid to drive pistons 89 and thus advance or retract jaws 18; while channels 91 and 92 collect pressurized fluid to supply to pistons 84 and thus advance or retract jaws 24.

A third annular channel 100 in axial passage 96 communicates through fluid passage 101 with annular chamber 54 to supply pressurized fluid for the actuation of annular piston 53. Similarly, a third annular channel 103 in axial surface 93 communicates through fluid passage 104 with annular chamber 70 to supply pressurized fluid for the actuation of annular piston 69.

Referring to FIGS. 3 and 4, an annular face seal 106 is fixed to an axially movable annular ring 107, which is rotationally fixed with respect to frame 7. Face seal 106 is disposed adjacent axial surface 96 with the open sides of channels 94, 95 and 100 and is radially wide enough to close all three channels. Fluid conduit means 108, including passages, tubes or hoses where appropriate, supply pressurized fluid through frame 7, ring 107 and face seal 106 to annular channel 100. Annular channel 100 is always in communication with fluid conduit means 108 while toroidal body 8 is rotating. Similar fluid conduit means, not shown, supply annular channels 94 and 95.

An annular flexible bladder or piston 110 disposed between annular ring 107 and frame 7 is adapted to receive pressurized fluid through conduit means 111 to expand or advance (in the case of a piston), push ring 107 toward toroidal body 8 and thus bias face seal 106 against axial surface 96 to seal channels 94, 95 and 100. The reduction in fluid pressure within bladder or piston 110 produces a reduction in sealing force between face seal 106 and axial surface 96.

Suitable pressurized fluid supply and control means, not shown, are supplied to introduce pressurized fluid into conduits 108 or one of the similar conduits, not shown, for actuating the mechanism for controlling jaws 18. This fluid control means is adapted to supply pressurized fluid to conduit 111 whenever such fluid is supplied to conduit 108 or one of the other conduits to actuate the face seal 106 only when it is necessary. Thus, the buildup of heat and wear on face seal 106 are reduced.

A similar face seal 113, annular ring 114 and annular bladder or piston 115 with appropriate conduit means, similar to conduit 108, are provided for the supply of pressurized fluid to and sealing of annular channels 91, 92 and 103. Appropriate conduit means similar to conduit 111 are provided for bladder 115.

In operation, the workpiece 21 is introduced and centered in workpiece area 19. Assuming that air at greater than atmospheric pressure, hereinafter simply called air, is the working fluid, air is introduced into bladder 115 and channel 103 simultaneously. The air expands bladder 115 and thus biases face sela 113 against axial surface 93 to prevent a leakage of air passing through annular channel 103 and passages 104 to annular chamber 70 where it biases annular piston 69 outward against springs 71. This allows movement of the actuating mechanism for jaws 24.

With chamber 70 still supplied with air, air is now supplied through channel 92 and passages 86 to chambers 83, where it causes pistons 84 to rotate ring gear 62. Ring gear 62 turns all pinions 61 and lead screws 59 to advance jaws 24 into engagement with surface 25 of workpiece 21.

When pistons 84 have reached their travel limits in one direction and all jaws 24 are in contact with workpiece 21, air is released from channel 103 to once again allow springs 71 to exert a clamping load through a piston 69, lock members 66, collars 65 and lead screws 59 onto jaws 24. Air is also released from annular channel 92 and bladder 115. Jaws 24 hold workpiece 21 firmly for rotation with toroidal body 8 and simultaneous working by tools 4 and 5 on whatever surfaces are most convenient, such surfaces including surface 22.

When work on workpiece 21 held by jaws 24 is completed, air is admitted to bladder 110 and through annular channel 100 and passages 101 to chamber 54, where it biases annular piston 53 outward against springs 55. Air is then introduced through channel 95 and passages 98 to chambers 88, where it forces pistons 89 and ring gear 34 clockwise to the position shown in FIG. 2. Ring gear 34 turns pinions 33 and lead screws 32 to advance jaws 18 into engaement with surface 22 of workpiece 21. Whichever jaws 18 reach workpiece 21 before the others, the slip clutches 37 associated with such jaws allow the ring gear 34 to continue to turn and advance all jaws 18 into contact with workpiece 21.

When all jaws 18 have been advanced into engagement with workpiece 21, air is released from annular channel 100 to allow springs 55 to exert a loading force through annular piston 53, lock members 49, collars 45, lead screws 32 and jaws 18. Air is also released from bladder 110 and annular channel 95.

The engagement of jaws 18 with workpiece 21 has been accomplished with toroidal body still rotating, since there is no need to stop the rotation. While this rotation continues, air is applied to bladder 115 and annular channel 103 to release the clamping force on jaws 24 and through annular channel 91 and passages 85 to chambers 83 to turn ring gear 62 in the direction to retract jaws 24 from workpiece 21.

Workpiece 21 can now be worked by tools 4 and 5 on any surfaces not previously worked, including surface 25. When this working is done, and the workpiece 21 is to be removed from chuck 3, jaws 18 can be retracted by supplying air to annular bladder 110 and annular channel 100 to remove the clamping force and simultaneously supplying air through annular channel 94 and passages 97 to chambers 88 to move pistons 89 and ring gear 34 counterclockwise from the position shown in FIG. 2 to retract jaws 18.

Normally, a loading-unloading device, not shown here, would bring the workpiece 21 into position for clamping in the chuck before machining and removal of same after machining is complete.

The chuck as described above is a preferred embodiment of this invention. Equivalent embodiments will occur to those skilled in the art upon reading this disclosure; and therefore this invention should be limited only by the claims which follow.

The embodiments of the invention in which an exclusive property or privilege is claimed are defined as follows:

1. A chuck to hold a workpiece in a machine for spinning the workpiece about an axis and machining surfaces thereof, the chuck comprising:
    an annular body rotatably disposed in the machine and adapted to be rotatably driven thereby;
    a first set of at least three jaws movable radially inward from the annular body to grip the workpiece;
    a second set of at least three jaws movable radially inward from the annular body to grip the workpiece, the second set of jaws being axially displaced from the first set whereby the first set of jaws grips the workpiece at a first outer surface and the second set of jaws grips the workpiece at a second outer surface axially displaced from the first outer surface;

means for moving the first set of jaws inward independently of the second set to grip the workpiece;

first locking means actuable, upon engagement of all jaws of the first set with the workpiece, to lock the first set of jaws in such engagement, whereby the workpiece can be turned about the workpiece axis and machined on surfaces including the second outer surface;

means for moving the second set of jaws inward independently of the first set into engagement with the machined second outer surface of the workpiece, locking the second set of jaws in such engagement to grip the workpiece, deactivating the first locking means and moving the first set of jaws radially outward from the workpiece, said means including, for each jaw of the second set, a slip clutch effective to limit the force applied by the associated jaw to the workpiece, whereby all jaws of the second set can be moved into engagement with the workpiece and the workpiece can be further turned and machined on surfaces including the first outer surface without stopping workpiece rotation or shifting the workpiece axis.

2. A chuck to hold a workpiece in a machine for spinning the workpiece about an axis and machining surfaces thereof, the chuck comprising:

an annular body disposed in the machine and adapted to be rotatably driven thereby;

a first set of at least three jaws movable radially inward from the annular body to grip the workpiece;

a second set of at least three jaws movable radially inward from the annular body to grip the workpiece, the second set of jaws being axially displaced from the first set whereby the first set of jaws engages the workpiece at a first outer surface and the second set of jaws engages the workpiece at a second outer surface axially displaced from the first outer surface;

first and second jaw set actuation means comprising, respectively, first and second sets of lead screws, one lead screw engaging each of the jaws and being effective to advance and withdraw the engaged jaw with rotation in opposite direction, first and second ring gears engaging all of the first and second sets, respectively, of lead screws, first and second fluid pressure motors actuably engaging the first and second ring gears, respectively, each fluid pressure motor having a piston in a chamber and being effective, upon admission of pressure fluid to one side of the piston, to rotate the associated ring gear in a direction to advance the associated set of jaws and, upon admission of pressure fluid to the opposite side of the piston, to rotate the associated ring gear in the opposite direction to withdraw the associated set of jaws, each of the second set of lead screws including a slip clutch effective to limit the force applied by the associated jaw to the workpiece, whereby all jaws of the second set can be advanced into engagement with the workpiece without shifting the workpiece axis;

first and second locking means associated with the first and second sets of jaws, respectively, the first and second locking means comprising, respectively, first and second sets of collars, one of the collars being associated and engageable with each lead screw, first and second sets of lock members, one of the lock members being associated and engageable with each collar to transmit a locking force through the associated collar and lead screw to bias the associated jaw against the workpiece, first and second locking spring means associated with the first and second set of lock members, respectively, and effective to bias the associated sets of lock members in the direction of engagement with the associated collars, and third and fourth fluid pressure motors separately actuable to exert force opposing the first and second locking spring means, respectively, to release the locking force of the first or second set of jaws from the workpiece;

means for applying fluid under pressure selectively to the fluid pressure motors, whereby the workpiece can be gripped by the first set of jaws and rotated about the workpiece axis for machining of surfaces including the second outer surface, then with continuing rotation the workpiece can be gripped by the second set of jaws and released by the first set of jaws for machining on the first surface.

3. The chuck of claim 2 in which the means for applying fluid pressure comprises:

at least one annular channel in an axial surface of the annular body;

a face seal in the machine axially movable with respect to the annular body but fixed against rotation therewith, the face seal being disposed axially adjacent the annular channel in the axial surface of the annular body and including conduit means communicating with the annular channel, whereby the fluid under pressure can be transferred from the stationary machine to the rotating body for actuation of a fluid pressure motor; and means for applying a biasing force on the face seal against the axial surface of the annular body, whereby leakage of fluid therebetween is reduced during actuation of the fluid pressure motor, and releasing the biasing force when the fluid pressure motor is not being actuated, whereby wear on the face seal is reduced.

* * * * *